J. E. THORNTON.
DAYLIGHT LOADING PHOTOGRAPHIC FILM PACK.
APPLICATION FILED MAY 13, 1907.

931,525.

Patented Aug. 17, 1909.
8 SHEETS—SHEET 1.

FIG. 1.

WITNESSES.
E. Howard
Joseph Bates.

INVENTOR.
J. E. Thornton
by J. O'Brien
atty.

J. E. THORNTON.
DAYLIGHT LOADING PHOTOGRAPHIC FILM PACK.
APPLICATION FILED MAY 13, 1907.

931,525.

Patented Aug. 17, 1909.
8 SHEETS—SHEET 3.

J. E. THORNTON.
DAYLIGHT LOADING PHOTOGRAPHIC FILM PACK.
APPLICATION FILED MAY 13, 1907.

931,525.

Patented Aug. 17, 1909.
8 SHEETS—SHEET 6.

WITNESSES
E. Howard
Joseph Bates

INVENTOR
J. E. Thornton
by
F. Lowenstein
atty.

J. E. THORNTON.
DAYLIGHT LOADING PHOTOGRAPHIC FILM PACK.
APPLICATION FILED MAY 13, 1907.

931,525.

Patented Aug. 17, 1909.

WITNESSES.
E. Howard
Joseph Bates.

INVENTOR.
J. E. Thornton

J. E. THORNTON.
DAYLIGHT LOADING PHOTOGRAPHIC FILM PACK.
APPLICATION FILED MAY 13, 1907.

931,525.

Patented Aug. 17, 1909.
8 SHEETS—SHEET 8.

WITNESSES.

UNITED STATES PATENT OFFICE.

JOHN E. THORNTON, OF ALTRINCHAM, ENGLAND.

DAYLIGHT-LOADING PHOTOGRAPHIC-FILM PACK.

No. 931,525.     Specification of Letters Patent.     Patented Aug. 17, 1909.

Application filed May 13, 1907. Serial No. 373,433.

*To all whom it may concern:*

Be it known that I, JOHN EDWARD THORNTON, British subject, and resident of Altrincham, county of Chester, England, have invented certain new and useful Improvements in Daylight-Loading Photographic-Film Packs, of which the following is a specification.

This invention relates to the device known as the film pack, that is, a sealed package of sensitive photographic films inclosed in a special form of case, which is sealed up by the maker before sale, and serves the multiple purpose of a packing case in which the films are packed and kept stored; as an exposing case, which is placed in the camera, and in which the films may be exposed in succession by transferring each one after exposure from the front to the back of the case, without light affecting any but the front film in the exposure position; and finally as a storage case in which the films may remain until required for development; the whole operations, including placing in the camera, transferring between exposures, and removal from the camera afterward, being conducted without recourse to a dark room. Films made up in this manner are termed daylight-loading flat films, and the complete sealed package a "film pack"; the user breaks a holding seal before he can use the package, and throws away the case when the films are developed; the case is therefore necessarily inexpensive in material, construction and total cost.

This invention comprises detail improvements over my former patent 666039 of January 15, 1901, and their object is to attain the following advantages:—to facilitate and cheapen the manufacture and operations connected therewith, to produce a case that can be readily filled by the manufacturers, in the dim light of the dark-room, with very little handling or fingering of the delicate sensitive films by the operative packers; to produce a case which is composed of movable or separable sections whereby the same can be easily opened by the user as often as desired for removal of one or more films for development; and yet be as easily resealed by him for use of the remaining unexposed films, or further storage of exposed films in the package; and to produce a well-finished workmanlike article which shall be reliable and shall not easily "go wrong" during use. These several advantages are attained combined with an exceedingly low cost of manufacture.

The component parts of the improved film pack are:—1. The films, with their backings, pull tabs and shoulders. 2. A rimmed inner sheath or film holder constructed with flanged rims and ends for holding the films and guiding them in their passage from front to rear, and with stops for the tabs to prevent the films being passed through. 3. A yielding spring division or pressure pad to keep the films pressed up against the rims of the sheath in the proper exposure position at front of the case or film pack. 4. An outer case or light-excluding wrapper. 5. A light-tight valve through which the pull tabs pass from inside to outside the wrapper sufficiently narrow to prevent the films passing through. 6. Stops to engage the film shoulders and prevent the films being entirely withdrawn from the case. 7. A light-excluding cover or flexible shutter to protect the face of the front film of the complete pack. 8. A sealing plug to exclude light and air from the used pack.

The invention will be fully described with reference to the accompanying drawings forming part of the specification.

Fig. 38. section of film pack showing the position of the closing plug K when drawn up to choke the film passage, the exposed films being omitted in this and the preceding figure to illustrate more clearly the operation of the sealing plug.

The flat cut films A are attached at or near their top edges to opaque sheets or backing papers B which are more than twice the length of the film. The extensions B' of the backing papers serve as pull tabs for transferring the films from one part of the case to the other, and are suitably shaped, numbered, or otherwise marked to indicate their sequence in the pack, and the like; and have spaces in which to write particulars of exposure; or may be printed with an advertisement. These backings B are the full width of the films, except in the part which serves as the pull tab, where they are cut somewhat narrower to form projecting shoulders $b$ which act as a stop to prevent the film being withdrawn entirely from the case. The films may be attached by narrow adhesive tapes $a$ of thin paper, fabric, or the like, so that they hang loosely from their backings. It is important that these 2-ply and 3-ply portions shall be as flexible as possible to insure ease of bending over during transference. The tab B' may be perforated at $b'$ for tearing off if desired, or may be torn against the sharp edge of the outer case instead in order that it may be thrown away after serving its purpose of transferring the film. (See more particularly Figs. 1 to 4.)

Figure 5:
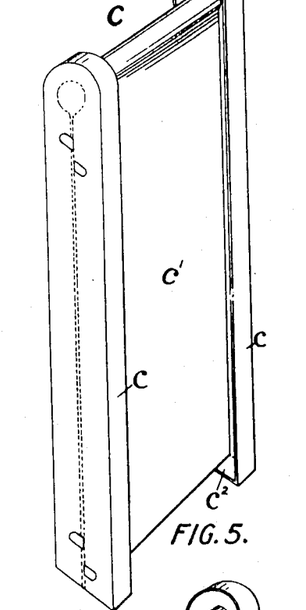
Fig. 5. perspective view of sheath for holding the unexposed films and their tabs constructed with a single dividing plate to form the two compartments, showing the stops for the tab shoulder.
Figure 6:
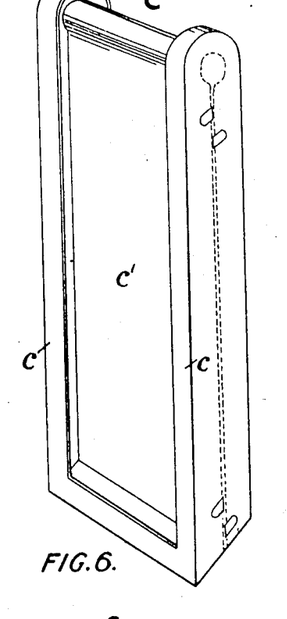
Fig. 6. perspective view of front of similar sheath for unexposed films and their tabs showing double dividing plates to form the compartments.
Figure 7:
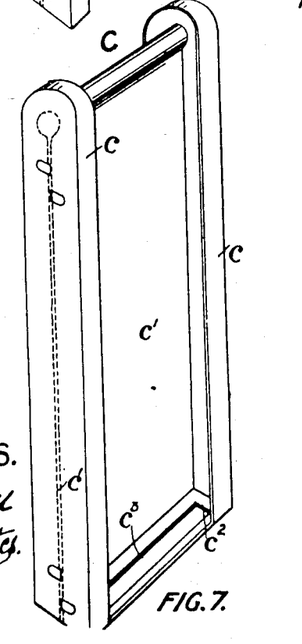
Fig. 7. perspective view of back of similar sheath showing a slot for the tabs to pass through and stops for the shoulders.
Figure 8:
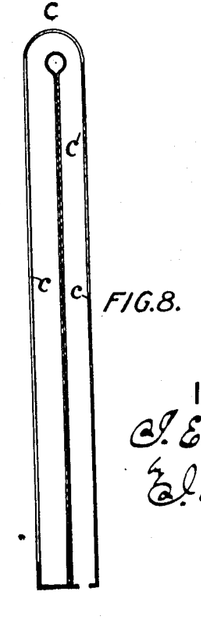
Fig. 8. transverse section.

The inner sheath or holder C for the unexposed films A and their pull tabs B' may be made of any suitable light material, such as paper, cardboard, or sheet metal, which can be readily bent to the desired shape and will retain its form. I at present propose to make the sheath C of cardboard, molded between suitable dies. The sheath is constructed so as to form two compartments, with guideways $c$ along the edges which will guide each film as it is moved from one side to the other. A dividing plate or partition $c'$ forms the two chambers or communicating compartments in which the films lie, the top of the partition being rounded to provide a suitably curved passage for the film, see Fig. 5; or it is made of a continuous groove-shaped piece which is formed with rimmed flanges thus making two compartments, see Figs. 6, 7, and 8, the result being the same in either case. The side edges of this sheath are turned up at right angles to form the guides $c$ and again at right angles to form rim flanges against which the edges of the film face may rest. In the forms shown in Figs. 5 to 8 the sheath may be made of two or more pieces, blocked or stamped to the desired shape and secured together. At the front of the sheath the guide piece $c$ is turned up to form the bottom rim, at the back the guide piece may be cut away for the pull tabs B' to pass, leaving two stop pieces $c^2$ for the shoulders $b$ of the tabs to engage (see Fig. 5), or it may be formed with a slot $c^3$ (see Fig. 7), for the pull tabs B' to pass through with the stops $c^2$ at either end.

Figure 1:
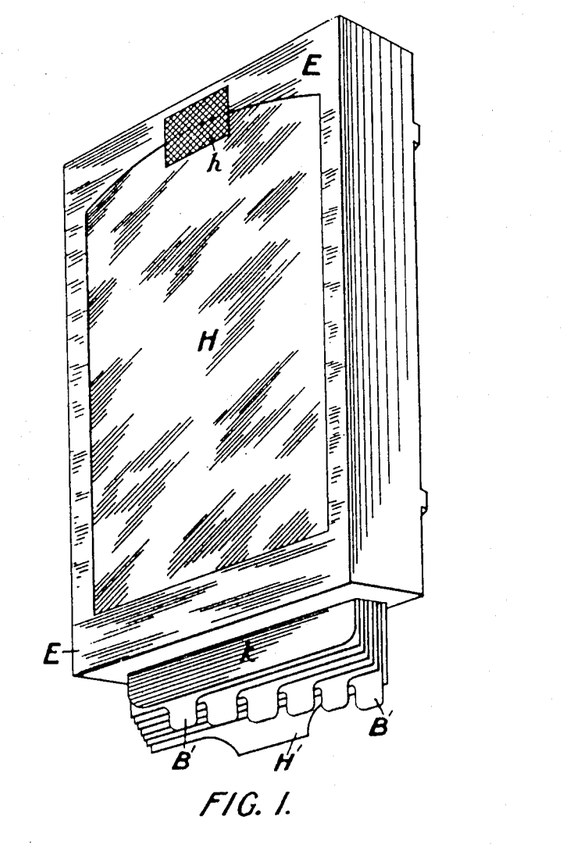
Figure 1. is a perspective view of the finished film pack ready for sale and use showing the safety cover and tap and superimposed bundle of pull tabs.
Figures 2, 3, 4:
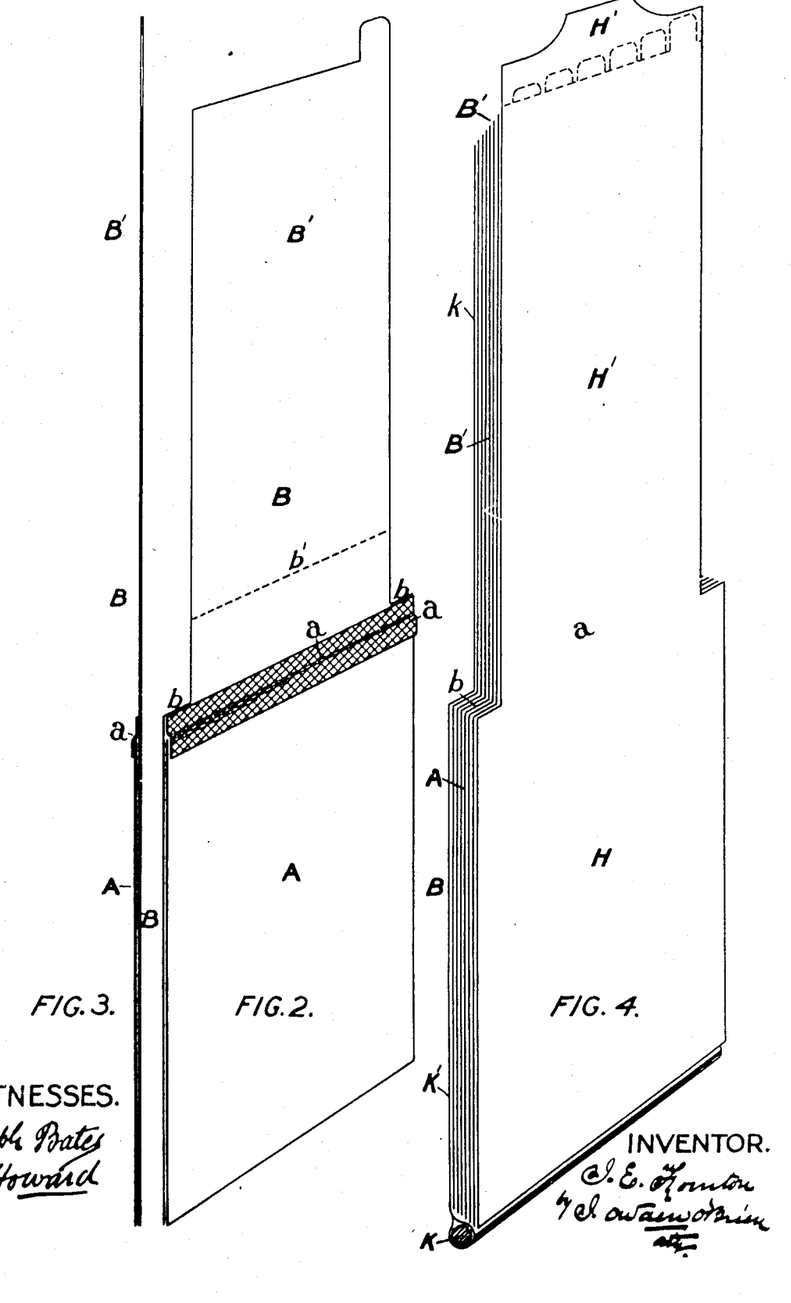
Fig. 2. front elevation of single film and tab.
Fig. 3. sectional elevation of same.
Fig. 4. perspective view of a bundle of films with tabs ready for insertion in the sheath or case the safety cover being on top and the closing plug at the end attached to the last leaf.
Figures 9, 10, 11, 12, 13, 14:
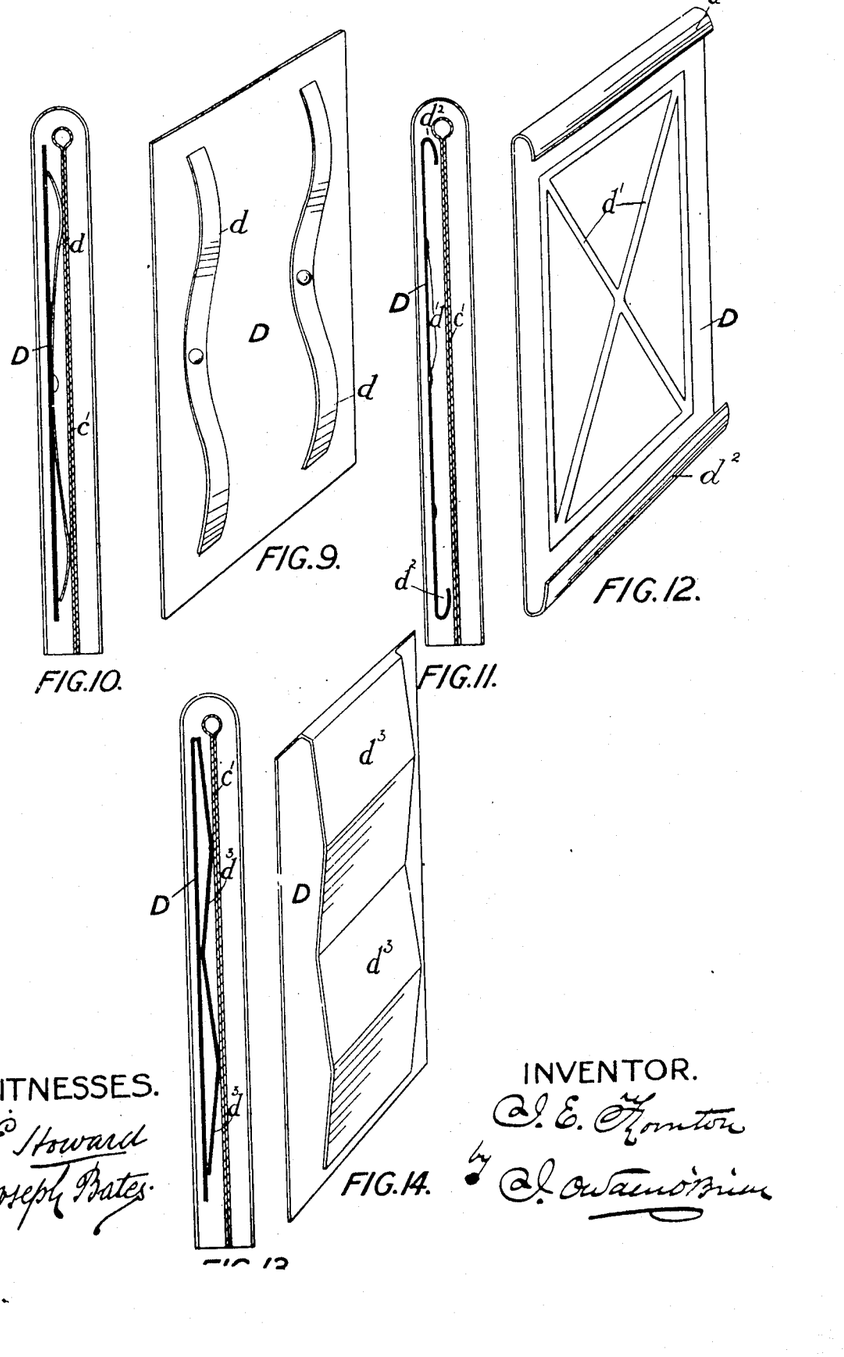
Figs. 9 and 10. section and perspective view of loose pad D formed of a piece of metal or cardboard with springs $d$ attached thereto.
Figs. 11 and 12. section and perspective view of loose pad D formed of a piece of cardboard with indented ribs $d'$ and with its ends turned over at $d^2$ so as to have sufficient spring in itself.
Figs. 13 and 14. section and perspective view of loose pad D formed of a piece of cardboard which is doubled over into two lengths the part $d^3$ being curved or corrugated to give the pad sufficient spring in itself.

A bundle of films A with their pull tabs B' arranged as in Fig. 4, are by the manufacturer placed in the sheath C, the film lying in the front compartment and the pull tabs B' in the back compartment, the guide pieces or rims $c$ retaining them in position. A loose spring pad D is inserted in the front compartment, between the bundle of films and the dividing partition $c'$ to continually press the films forward against the guide pieces or rims $c$. The pad D may be a flat piece of cardboard, sheet metal, wood, or other material, stiffened by the ribs $d'$ and provided with light springs $d$ attached to one side (see Figs. 11 and 12). Or when made of cardboard the ends $d^2$ may be bent over to one side to give a yielding spring to the pad so as to have sufficient spring in itself to force the films in succession to the front, see Figs. 11 and 12. Or it may be made of a piece of cardboard bent or doubled over the back portion $d^3$ being provided with a series of bends or corrugations to give it sufficient spring in itself to press the films forward, see Figs. 13 and 14. Or any other suitable equivalent may be used to keep the films up to the correct focal plane.

Figures 15, 16, 17, 18, 19:
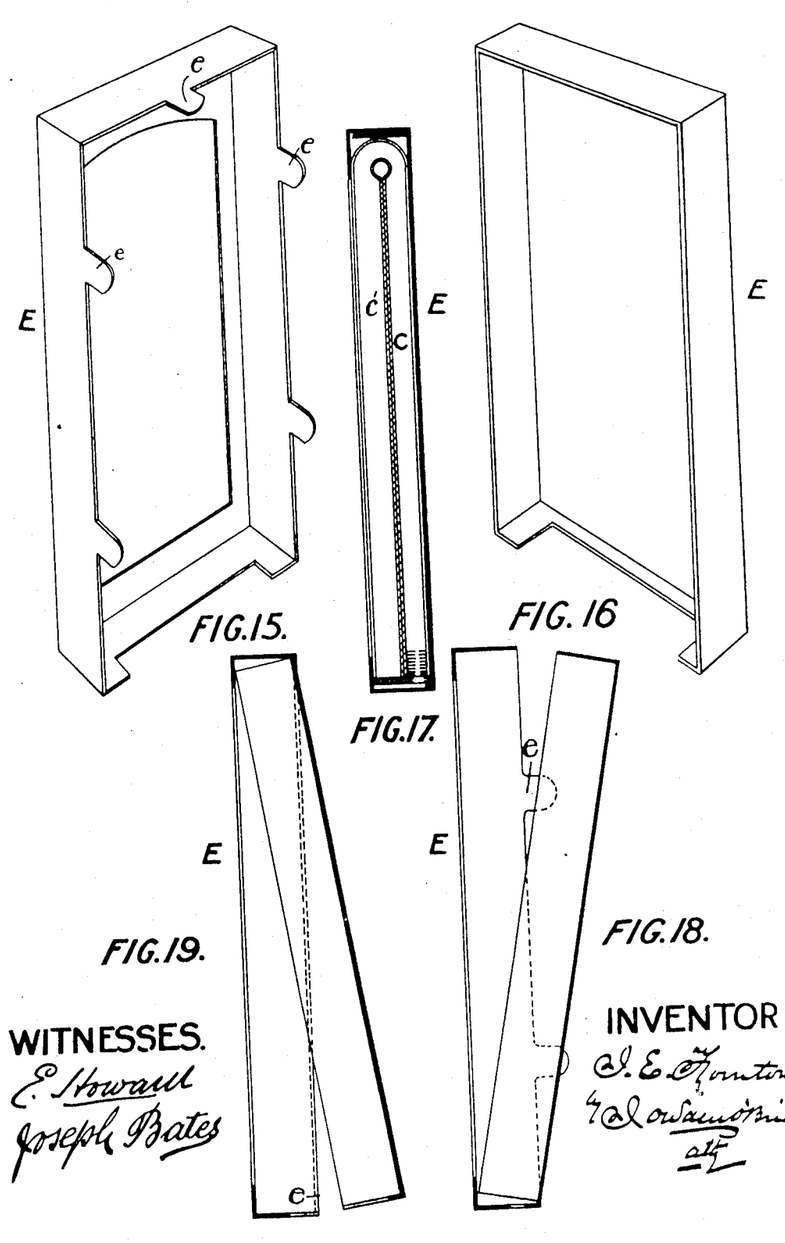
Fig. 15. perspective view from interior of front part of case E.
Fig. 16. perspective view from interior of back part of case E.
Fig. 17. section of case E and sheath C in position.
Figs. 18 and 19. sections showing modifications of the case E made in one piece the front and back parts being hinged together.
Figure 20:
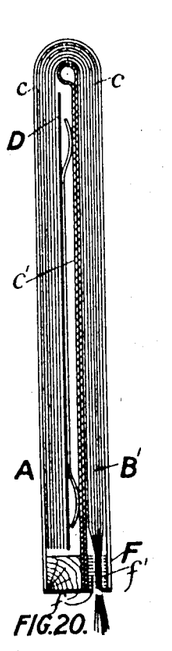
Figs. 20, 21 and 22. sections of the complete film pack with the outer case E detached representing the style of case E sheath C and valve F preferred in actual manufacture.
Figure 21:
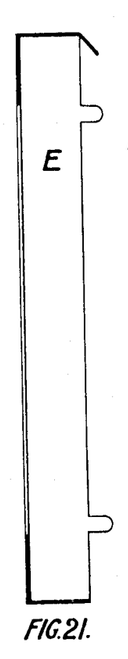
Figure 22:
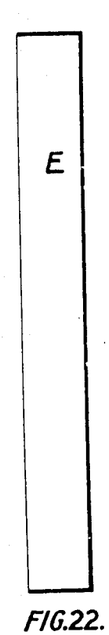
Figure 23:
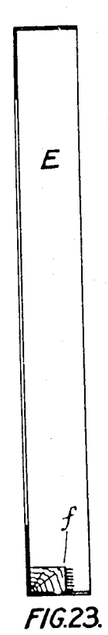
Figs. 23, 24 and 25. sections with outer case E detached showing the valve F made of two pieces of plush $f'$ one attached to the front part and the other $f'$ attached to the back part of the case E.
Figure 24:
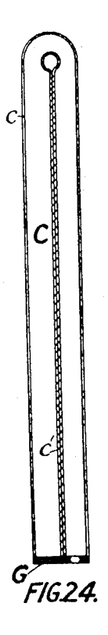
Figure 25:
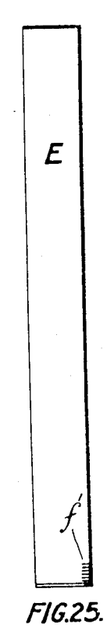
Figure 26:
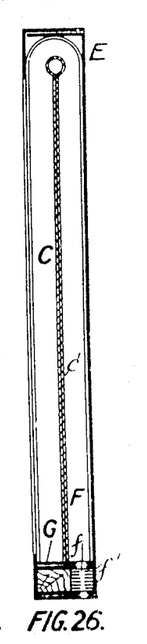
Fig. 26. section showing the parts in position and the slotted light trap plate G inserted between the sheath and the valve.
Figure 27:
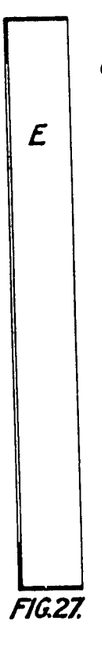
Figs. 27, 28 and 29. similar sections with the sheath C made full length of the case E and the valve F of two pieces of plush $f$ $f'$ placed in the sheath.
Figure 28:
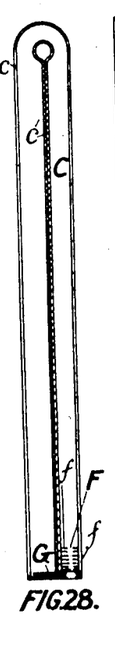
Figure 29:
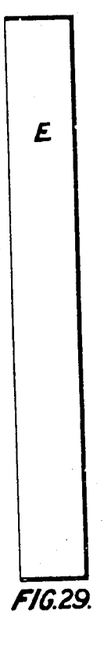
Figure 30:
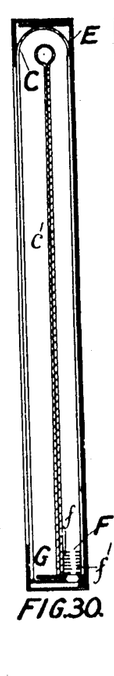
Fig. 30. section showing the parts in position.

The outer case or light excluding wrapper E is likewise made of paper, cardboard, sheet metal, or other light material that can be readily bent and will retain its shape. It may be formed in several shapes and constructions, but I have found the two following convenient, either of which are used according to size and requirements of pack to be made. In the first shape the case is made in two separate parts, as two shallow boxes that fit one within the other inclosing the sheath and films between as in a box with lid see Figs. 15, 16, 17 and 20 to 25. In the other modification the two parts are hinged or joined together as one piece that may be folded up and closed together book fashion, the turned up flanges or sides of one half fitting over and inclosing the similar sides of the other half (see Figs. 18 and 19). The two halves of either form of case are held together in any suitable way; for instance, if of metal they will fit so tightly within each other when forced together that they can only be parted by the insertion of a lever, such as a knife edge, coin, or the like; if of paper, or cardboard they may be secured by a label or adhesive strips; but I prefer to make one section of the case with sheet metal clips $e$ or turned over flanges, or the like, either of which can be easily bent or re-bent (Fig. 15). These halves or sections of the case may, however, be retained in coöperative relation by any other suitable means.

Figure 31:
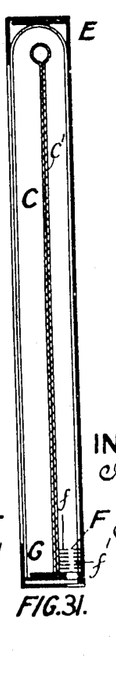
Fig. 31. section showing the valve F arranged with one piece of plush $f$ attached to the sheath and the other piece $f'$ attached to the back of case E.
Figure 32:
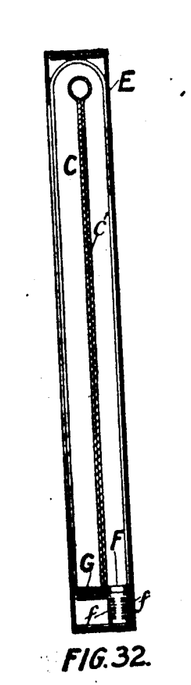
Figs. 32 and 33. sections showing the valve F formed independent of either the sheath C or case E and placed inside of the case for the sheath to rest upon.
Figures 33, 34:
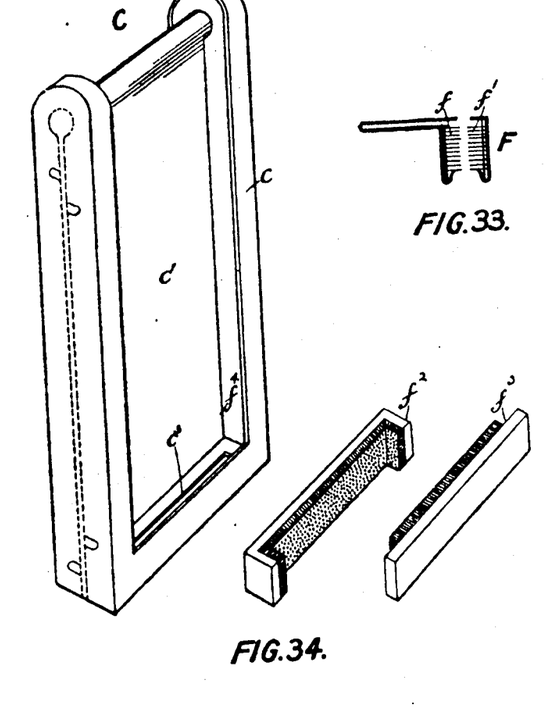
Fig. 34. perspective details of a further modification.

The valve F in the case E, through which the pull tabs B' pass from the inside to outside of the pack, is so constructed as to exclude any possibility of light entering, and yet allow ample freedom of action of the tabs (which are superimposed in a pile) without adding undue pressure such as would cause the pulling of one tab to drag another tab and film with it by frictional contact. The valve F may be formed in several ways but the two following examples have both been found effective, inexpensive, and reliable in practice. The first form consists of two pieces of long pile plush, cloth or the like $f$ $f'$ so placed that they inclose the bundle of tabs between. These are secured in position by adhesive cement, or by metal strips which are bent over to inclose and grip their edges. Each piece forms one half of the valve and the two may be attached to the corresponding halves of the outer case E (see Figs. 23 to 26) or one piece to the case and the other to the inner sheath; (see Fig. 31) so that when the package is properly closed up the valve shall be complete; or both sections may be inserted in the sheath itself, thus making the sheath and valve complete before the case is put on, (Figs. 27 to 30.) A slotted plate G may be placed on one or both sides of the valve as a further light-trap. In the other modification I form the valve complete as a whole, by bending the plush, or the plush and its metal backing, around the bundle of films as an endless band or ring, and through the slot thus formed the film tabs pass. The valve is then placed in position between the halves of the case, or through a slot in the shallow side thereof, and is held in position, and prevented from passing too far through, by a rim or flange formed on the valve by turning up its edges (Figs. 32 and 33). In another modification (see Fig. 34) the valve may be made in two loose parts $f^2$ $f^3$ of felt plush or other material of a yielding nature. In making up the pack and packing in the films the part $f^2$ is placed in position in the back compartment of the sheath at $f^4$, then the tabs are laid in, and the part $f^3$ placed in position, thereby forming a slotted block of yielding pile which is held in place against the partition $c$ of the sheath C by the outer guide rim or flanges. The film tabs B' are provided with shoulders $b$ as hereinbefore described, and the valve slot is therefore made only wide enough to pass the narrow portion of the tabs through.

The front side of the inclosing case or wrapper E has an aperture cut therein, a little less than the film to be exposed behind it, and this aperture is closed by the maker, when sealing up the package, by means of a leaf H of opaque paper, of single, double, or treble thickness, provided with a pull tab H' like those attached to the films. The outer end of this tab is marked "Safety cover" (or some such wording) to indicate its purpose to the user (see Figs. 1 and 4). This cover may be secured against accidental withdrawal if necessary by an adhesive label $h$ attached to cover and case (see Fig. 1).

Figures 35, 36:
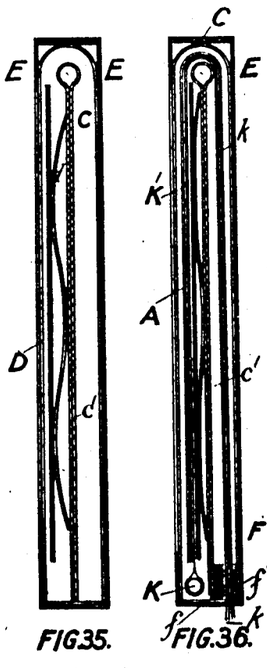
Fig. 35. section of outer case closed by the spring pad D.
Fig. 36. section of film pack showing position of the closing plug K before the films are exposed.
Figure 37:
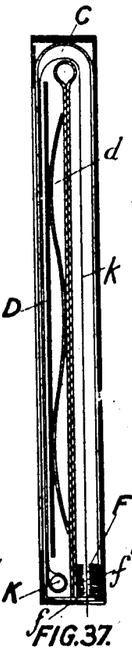
Fig. 37. section of film pack showing position of the closing plug K after the films are all exposed.

To close the film passage and prevent entrance of light when the films have been all exposed, a plug K may be employed (see Figs. 36 to 38) attached to a cover paper K with a pull tab $k$. The plug K is drawn up by its own tab K' until it is squeezed into and completely fills or chokes up the film passage, thus perfectly excluding all light. The plug K and its tab K' may be of any suitable yielding material, such as paper, cloth, plush, or the like.

The complete film pack may be placed directly into a camera of suitable size and shape, having a narrow rim or flange (against which its face may rest) surrounding the exposure opening. It may be held securely in position by turn buttons, springs, retaining flanges, or the like; or it may simply be slipped into a groove, as usual with most plate holders. For cameras where the film pack is too small, the difference in size is made up by means of an adapter or frame, similarly provided with retaining means. For cameras where it is desired to remove the film pack between each exposure, for focusing purposes, or for any other reason, such as convenience in transit, the front of the adapter is closed by a shutter of any ordinary well-known type as used in dark slides.

To use the film pack the operator places it in position in the camera, in open daylight either directly or by means of one of the aforesaid forms of adapter, first removing or breaking the label that secures the safety cover, and then draws out the first tab (attached to the said cover) to its fullest extent, tearing off and throwing away the now useless tab. The front film is by this action uncovered in the camera and subsequently duly exposed. Upon pulling the next tab (attached to this exposed film) in a similar manner, the first exposed film is removed from before the pile in the front portion of the sheath, along the guideways to the back portion of the sheath, the next film taking its place in front. The operations are repeated until all are exposed, when the films, having all been transferred to the back of the sheath, are thereby protected from light, and the film pack may then be removed from the camera in daylight. The spring pad further serves to close the package against entry of light (see Fig. 35), and I do not find, in practice, that any further protection is necessary; in fact the light does not find entry around the curved film passage even if the pressure plate should not close the opening quite perfectly, especially as the whole interior of the case is blackened to avoid reflection of any light that may strike the parts. But when further protection is required, as may sometimes be desirable, say in the case of large sizes of film packs, another safety cover may be applied after the last film, similar to the one already described at the front.

By this invention (in which the mounting of the films, backings, and tabs is absolutely independent of the inclosing case, pressure pad, or receiving chamber) owing to the use of my inner sheath or carrier, the correct and free working of the films during transference can be thoroughly tested by the manufacturer before being incased, and if the valve is placed entirely in the sheath itself, the whole combination is absolutely independent of the case, so far as working goes.

This feature distinguishes this invention from those heretofore known in which free movement of the films can only be tested when they are inclosed in the case and the case secured, which necessitates the whole film pack being unsealed, opened and again resealed, in order to rectify any irregularity.

What I claim as my invention and desire to protect by Letters Patent is:—

1. In a film pack, comprising a sealed package of daylight loading flat films for use in a camera, of the type referred to a rimmed inner sheath or carrier with a recess at the front side to receive a bundle of films having extension tabs and backings; a rounded nose at the top over or around which the extension tabs or backings may be placed before use, and the films be drawn after exposure; a recess at the back side in which the extension tabs may lie before use, and the films be drawn after exposure; rims or flanges to retain the films in the sheath and forming, in combination with the sides, guide-ways to define the path of the film during the transfer movement; and with stop plates to engage with shoulders on the extension tabs and backings to prevent withdrawal of the films from the sheath and with the elements of a light-valve to grip the extension tabs substantially as described.

2. In a film pack, comprising a sealed package of daylight-loading flat films for use in a camera, of the type referred to, the combination with a sheath such as described of a spring pressure pad inserted between the back of the bundle of films and the front recess of the sheath in which they lie, for the purpose of keeping the front film in the correct focal plane against the front flanges of the sheath, and to compensate for the diminishing thickness of the bundle of films as they are successively exposed and withdrawn, and in addition to close the open front of the case after all the films have been transferred, substantially as described.

3. In a film pack comprising a sealed package of daylight-loading flat films for use in a camera, of the type referred to, the combination of a sheath such as described and an outer case or light-excluding wrapper, substantially as described.

4. In a film pack comprising a sealed package of daylight-loading flat films for use in a camera, of the type referred to, the combination, with a sheath and a light-excluding case or wrapper such as described, of a spring pressure pad placed within the sheath and the case.

5. In a film pack comprising a sealed package of daylight-loading flat films for use in a camera, of the type referred to, the combination, with a sheath, a pressure pad, and a case such as described, of a light-tight tab valve, in conjunctive operation with the case, substantially as described.

6. In a film pack comprising a sealed package of daylight-loading flat films for use in a camera, of the type referred to, the combination, with a sheath such as described and a case or wrapper having an exposure opening in the front side thereof, of a safety cover or flexible shutter to close and seal the said opening, substantially as described.

7. In a film pack comprising a sealed package of daylight-loading flat films for use in a camera, of the type referred to, the combination with a sheath such as described, a perforated case or wrapper, and a safety cover to close such opening, of a spring pressure pad placed within the case and sheath, substantially as described.

8. In a film pack comprising a sealed package of daylight-loading flat films for use in a camera, of the type referred to, the combination of a sheath such as described having front and rear recesses and a bundle of films (having extension tabs and backings) placed in the front recess of the sheath, substantially as described.

9. In a film pack comprising a sealed package of daylight-loading flat films for use in a camera, of the type referred to, the combination, with a sheath and a bundle of films as described, of a spring pressure pad to press the films against the rim flanges of the sheath, substantially as described.

10. In a film pack comprising a sealed package of daylight-loading flat films for use in a camera, of the type referred to, the combination with a sheath, a bundle of films, and pressure pad such as described, of an outer case or light-excluding wrapper, substantially as described.

11. In a film pack comprising a sealed package of daylight-loading flat films for use in a camera, of the type referred to, the combination with a sheath, bundle of films, pressure pad, and outer case or wrapper having an exposure opening in the front thereof, of a safety-cover or flexible shutter to close and seal the said opening substantially as described.

12. In a film pack comprising a sealed package of daylight-loading flat films for use in a camera, of the type referred to, the combination with a sheath, pressure pad, outer case, and bundle of films, of a light-tight tab valve through which the extension tabs may pass to the outside of the case, in order that the films may be drawn from the front to the back of the sheath and case, substantially as described.

13. In a film pack comprising a sealed package of daylight-loading flat films for use in a camera, of the type referred to, the combination of a sheath such as described and a valve, substantially as described.

14. In a film pack comprising a sealed package of daylight loading flat films for use in a camera, of the type referred to, the combination of a sheath such as described and a valve placed in the case, substantially as described.

15. In a film pack comprising a sealed package of daylight loading flat films for use in a camera, of the type referred to, the combination of a sheath such as described and a valve formed within the case, substantially as described.

16. In a film pack comprising a sealed package of daylight loading flat films for use in a camera, of the type referred to, the combination of a sheath such as described, an outer case or light-excluding wrapper, and a valve substantially as described.

17. In a film pack comprising a sealed package of daylight-loading flat films for use in a camera, of the type referred to, the combination of a sheath such as described, an outer case or light-excluding wrapper, and a valve placed in the case, substantially as described.

18. In a film pack comprising a sealed package of daylight-loading flat films for use in a camera, of the type referred to, the combination of a sheath such as described, an outer case or light-excluding wrapper, and a valve formed within the case, substantially as described.

19. In a film pack comprising a sealed package of daylight loading flat films for use in a camera, of the type referred to, and having an inner sheath and outer case, a light-tight tab valve, substantially as described.

20. In a film pack comprising a sealed package of daylight-loading flat films for use in a camera, of the type referred to, having an inner sheath and outer case, a light-tight tab valve formed within the case, substantially as described.

21. In a film pack comprising a sealed package of daylight loading flat films for use in a camera, of the type referred to, and having an inner sheath and outer case, a light-tight tab valve formed between the two opposite sections of the case, substantially as described.

22. In a film pack comprising a sealed package of daylight-loading flat films for use in a camera, of the type referred to, and having an inner sheath and outer case, a light-tight tab valve formed within the case, and operating in conjunction with the sheath, substantially as described.

23. In a film pack comprising a sealed package of daylight loading flat films for use in a camera, of the type referred to, and having an inner sheath, an outer case, and a bundle of films within the case having extension tabs which pass through a light-tight tab valve to the outside of the case, stops formed on the sheath, engaging with shoulders on the tabs, the backings, or films, to prevent the films being withdrawn from the case through the tab passage, substantially as described.

24. In a film pack comprising a sealed package of day-light-loading flat films for use in a camera, of the type referred to, and having an inner sheath, an outer case, and a bundle of films within the case having extension tabs which pass through a light-tight tab valve to the outside of the case, stops formed by a slotted part, the said slot being only long enough to pass the narrow tabs, and therefore engaging with the shoulders on the tabs, to prevent the films being withdrawn from the case, substantially as described.

25. A film pack comprising a sealed package of daylight-loading flat films for use in a camera, of the type referred to, comprising an outer case or light-excluding wrapper; a valve to prevent entrance of light to the case; a flanged double sheath inside the case; a bundle of flat films mounted in the front recess of the sheath, and having extension tabs which pass over the rounded top of the sheath, through the back recess of the sheath, and out of the case by the light-tight valve; a spring pressure pad between the films and the sheath in the front recess thereof; an exposure opening being formed in the front of the case; a removable safety cover or shutter to protect the front film of the pack lying behind such opening; and with a sealing plug to choke the film passage after all the films have been drawn into the rear recess of the sheath; and with a severable holding label to secure the safety cover against accidental displacement, substantially as described.

26. A film pack or sealed package of daylight-loading flat films for use in a camera, of the type referred to, having the opposite sections of the case or light-excluding wrapper secured together by bendable metal portions, can be bent or forced open, and again re-bent to close, in order that the package may be readily unsealed or re-sealed by the user, substantially as described.

27. In a film pack comprising a sealed package of daylight-loading flat films for use in a camera, of the type referred to, the combination, with a sheath and case such as described, of a sealing plug which can be drawn into the fixed film passage existing between the sheath and case, to choke or seal the said passage against entry of light, substantially as described.

28. In a film pack, comprising a sealed package of day-light-loading flat films for use in a camera, of the type referred to—a rimmed inner sheath or carrier characterized by flanged rims and ends in one piece to hold the films and guide them in passing from front to rear and forming a chamber at the front to receive a bundle of tabbed films and a chamber at the back in which the tabs lie before use with stop plates to engage shoulders on the extension tabs to prevent withdrawal of the films from the sheath; and with the elements of a light-valve to grip the extension tabs and a rounded nose at the top around which the extension tabs are placed before use, and the films drawn after exposure; constructed substantially as described.

In witness whereof, I have hereunto signed my name in the presence of two subscribing witnesses.

J. E. THORNTON.

Witnesses:
I. OWDEN O'BRIEN,
HARRY BARNFATHER.